United States Patent [19]

Andersen

[11] 4,062,485
[45] Dec. 13, 1977

[54] EXOTHERMIC WELDING DEVICE

[76] Inventor: Leonard M. Andersen, 46 Alexander Ave., Yonkers, N.Y. 10704

[21] Appl. No.: 757,303

[22] Filed: Jan. 6, 1977

[51] Int. Cl.$^2$ .......................... B23K 23/00; B63C 7/16
[52] U.S. Cl. ........................................... 228/56; 75/27; 164/DIG. 12; 114/51; 228/241; 294/86.1
[58] Field of Search ..................... 228/56, 241; 114/50, 114/51; 294/86.1; 75/27; 164/DIG. 12, 54

[56] References Cited

U.S. PATENT DOCUMENTS

| | | | |
|---|---|---|---|
| 1,388,363 | 8/1921 | Miller | 114/51 |
| 1,803,135 | 4/1931 | Ross | 75/27 X |
| 2,286,075 | 6/1942 | Evans | 164/54 X |
| 3,070,874 | 1/1963 | Davis | 228/241 X |
| 3,871,315 | 3/1975 | Anderson | 114/51 |

Primary Examiner—Al Lawrence Smith
Assistant Examiner—K. J. Ramsey
Attorney, Agent, or Firm—Darby & Darby

[57] ABSTRACT

Exothermic welding device for welding to a surface underwater includes a Thermit charge surrounded by a movable inner casing abutting a plate. The plate includes magnetic or other means for attaching the device to the surface to be welded. Urging means force the Thermit melt through the surface. The urging means disclosed are a weight, spring, or pressure system arrangement. An outer housing surrounds the inner housing and urging means, and joins the plate. The device may be used for underhand or overhead welding, or to a vertical surface.

15 Claims, 6 Drawing Figures

EXOTHERMIC WELDING DEVICE

BACKGROUND OF THE INVENTION

The present invention relates to welding devices and methods, and more particularly to Thermit welding.

The preferred embodiments of the present invention refers specifically to a welding device suitable for salvaging metal objects under water. However, the invention may also be used for dry welding, i.e. above the water surface.

The salvaging of underwater objects is an expensive, complex, and frequently dangerous undertaking. Conventional electrical arc underwater welding may be employed, but is rather expensive. Electrical welding underwater requires a large power source and personnel trained in the technique. Due to the water environment, the method frequently yields an inferior weld. The expense and complexity of such welding limits its use to extreme necessity.

Another technique is to utilize a diver, who may secure grappling means to the objects to be salvaged so that it can be raised to the surface. However, divers are not able to descend to depths greater than 1000 feet below the water surface, even employing recent developments in saturated diving. Because approximately 95 percent of the entire ocean floor lies at a depth greater than 1000 feet, there is a need for devices and methods suitable for salvaging at such depths. One way to perform such welding is to use a deep submersible, and employ a welding process which can be controlled remotely.

The use of exothermic welding offers significant advantages. Thermit reactions are relatively simple chemically. Thermit welding devices do not require large power supplies, may be quickly deployed, and, in accordance with the present invention, may be positioned accurately from a remote position, i.e. a submersible. The last-mentioned advantage is of major significance insofar as the welding is accomplished without "feel", that is, there is no weld puddle or arc to be maintained. Thus, exothermic welding is viable at extreme depths.

U.S. Pat. No. 3,871,315 to Andersen discloses a device for Thermit welding which may be attached magnetically to a ferrous object. After the exothermic Thermit reaction initiates, the welding device attaches itself to the ferrous object. Andersen discloses specifically a Thermit materal which has been compressed to about 8,000, psi together with a compressed flux disposed within a cylindrical steel inner housing having an open top. Positioned above the Thermit mixture is a lightly compressed Thermit mixture serving as igniting means, which surrounds a pair of ignition wires. The open end of the housing is capped by a seal, and an outer housing is positioned over the inner housing. A copper ring at the lowermost position of the device serves to retain molten metal as the Thermit burns.

Although the previous device represented a substantial improvement over the art, it had certain drawbacks. First, the Thermit used was compressed to a pressure of approximately 8,000 psi. Achievement of such pressures may be expensive or impractical on a large scale. Accordingly, one object of the present invention is to provide a new method for obtaining a Thermit core with minimal contained surface area and air pockets therein.

Another drawback of previous exothermic devices is the requirement that they be positioned on top of a substantially horizontal surface. For example, in most ocean vessels and in off-shore oil platforms, on "anode" assembly is affixed to a steel surface. This anode is designed to oxide sacrificially, to preserve the steel. The prior art devices for exothermic under water welding are adapted to assist welding of such an anode to a horizontal surface, but not to other orientations. Consequently, a further object is to provide an underwater welding device capable of affixing an anode or other device to surfaces in any plane. further, it is an object to provide for underwater repairs involving welding to surfaces in any plane.

After the Thermit of the previous device retracted and welded, there was a possibility that seawater would enter and rapidly cool the weldment. Accordingly, another object of the invention is to provide a device which will insulate the weldment from seawater, thereby to improve the weld strength by affording an annealing time.

A further drawback with the previous device is the excessive electrical current needed to begin the Thermit reaction. Nickel-chromium wire was disposed within a lightly compressed mixture of fine particle aluminum powder and fine particle iron oxide in proportion by weight of three to seven. The electrical current necessary to institute the reaction of the igniting powder was provided by any means such as a battery from an automobile. While such igniting means was a considerable improvement over the prior art, it has been found that further improvements can be made to render unnecessary the transportation of such cumberous and heavy electrical power source. Accordingly, another object of the present invention is to provide an improved means to intiate Thermit reactions.

Generally, underwater salvaging will involve attaching a suitable device to a ferrous object which is covered by a paint surface. To provide a strong weld, paint or other impurities should be removed from the actual ferrous layer to be welded, and an explosive charge was therefore used to clean the metal surface. A final object of the present invention is to provide improved means for cleaning the surface to be welded.

SUMMARY OF THE INVENTION

The above and other objects are obtained by providing a Thermit mixture which has been subjected to an elevated temperature at a high pressure. The Thermit main charge is disposed within a movable inner casing, and is proximate a fuse which melts on the application of relatively small current, i.e., from two dry cells of the "D" type. The electrical current and heat cause a primer of fine Thermit powder to react exothermally. The primer burns and ignites a booster, which may be a lightly compressed and somewhat courser Thermit mixture. The booster, in turn, ignites the main or primary charge previously described.

The casing is disposed within an outer housing to exclude seawater before ignition. Means are provided to urge the movable inner casing towards the surface to be welded. After the Thermit reaction begins, the portion of the plate immediately adjacent or below the inner casing melts. The urging means pushes the melting plate into the melted surface to be welded. This results in an improved weldment by causing the formation of a barrier between the sea and the weldment. This assures improved annealing.

Preheating is achieved by a heat-conductive train to the surface to be welded. A load bearing plate has indentations on one side adapted to conform to the shape of the movable inner casing. The opposite (outer) side of the load bearing plate includes a ridge or other extension alinged with the indentation on the opposite side. This indentation contacts the surface to be welded and pre-heat the surface before the molten Thermit melts through the load bearing plate. It also serves to improve the seal of the melted load bearing plate immediately below the Thermit, which seals off the seawater.

BRIEF DESCRIPTION OF THE DRAWINGS

In describing the preferred embodiment reference is made to the appended drawings in which.

DESCRIPTION OF THE PREFERRED EMBODIMENT

Figure 1:
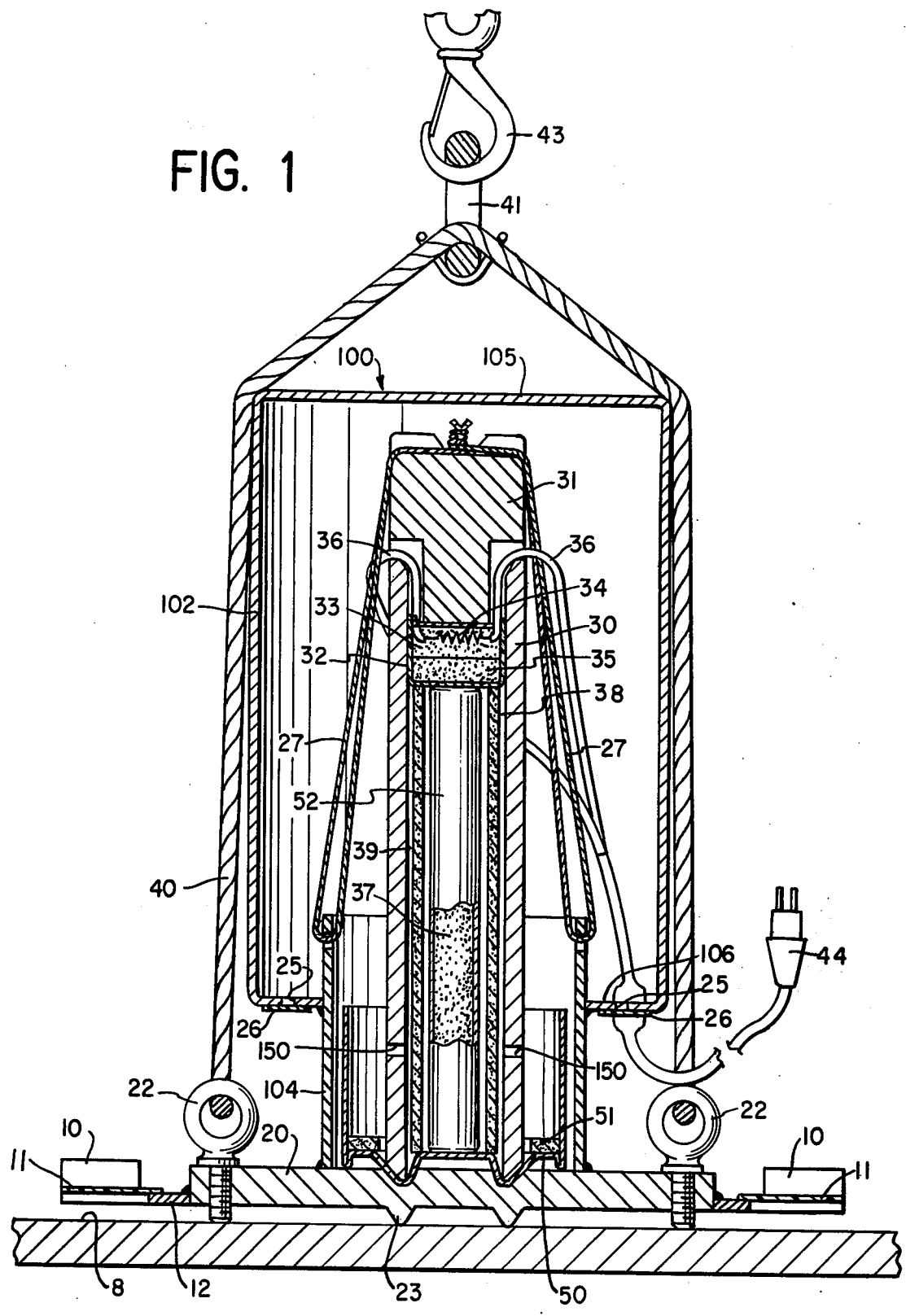
FIG. 1 is a sectional side view of an embodiment of the present invention adapted for underhand welding of metallic objects under water.

Referring to FIG. 1, a primary charge 37 of an exothermic mixture such as Thermit is surrounded by an aluminum casing 52. Various types of Thermit may be used in an exothermic reaction, and the preferred embodiment uses a mixture of ferric oxide and aluminum, which proceeds according to the reaction:

$$3Fe_3O_4 + 8Al \rightarrow 9F_e + 4Al_2O_3 + 719.3 \text{ Kcal}$$

Other exothermic reactants may be used and include, for example, the following:

$$3FeO + 2Al \rightarrow 3Fe + Al_2O_3 + 187.1 \text{ Kcal}$$

$$Fe_2O_3 + 2Al \rightarrow 2F_e + Al_2O_3 + 181.5 \text{ Kcal}$$

$$3CuO + 2Al \rightarrow 3Cu + Al_2O_3 + 275.3 \text{ Kcal}$$

$$3Cu_2O + 2Al \rightarrow 6Cu + Al_2O_3 + 260.3 \text{ Kcal}$$

$$3NiO + 2Al \rightarrow 3Ni + Al_2O_3 + 206.6 \text{ Kcal}$$

$$Cr_2O_3 + 2Al \rightarrow 2Cr + Al_2O_3 + 546.5 \text{ Kcal}$$

$$3MnO + 2Al \rightarrow 3Mn + Al_2O_3 + 403.0 \text{ Kcal}$$

$$3MnO_2 + 4Al \rightarrow 3Mn + 2Al_2O_3 + 1041.0 \text{ Kcal}$$

Any of these exothermic reactions, and others, may be used. However, for salvaging or welding to ferrous plates, one would not ordinarily use a copper reaction, but rather an iron reaction, and vice versa. Accordingly, the approximately exothermic mixture may be selected by the user, and the use of the ferric oxide with aluminum is in an illustrative sense.

The Thermit powder forming the main charge 37 is not in a powder form, but rather in the form of a sintered mass. This is achieved by having previously elevated the temperature of the powder mixture to approximately 1000° F. and subjecting it to a pressure of approximately 4000 pounds per square inch. In this environment the aluminum particles fill in the air spaces of the powder to yield a product which, when cooled, provides substantial improvements over the form of the Thermit currently known. This new physical form of the Thermit mixture has greatly reduced surface area since it is a low-porosity solid. This solid Thermit burns faster. Further, this physical state of Thermit is machinable, so that a Thermit mixture in this physical form may be machines to a precise size.

Annularly surrouding the primary charge 37 and its aluminum casing 52 is a self-standing flux casing 39. This flux may comprise known materials such as, for example, high cellulose welding rod coating or H-700 submerged arc welding flux sold by Hobart Brothers Company of Troy, Ohio. This flux material aids in controlling the flow of the molten iron, and improves the quality of the weldment to be made.

Annularly surrounding the flux casing 39 is an inner casing 30 made of iron, for example. This casing is disposed a short distance radially from the free standing flux casing 39, thereby leaving an air space 38 between the inner casing 30 and the flux 39.

The inner casing 30 annularly surrounds the charge 37 and flux 39, and extends in a vertical direction upward a few inches beyond the ton of the charge 37. This upward extension provides a space in which to house the ignition assembly and to support a weight whose purpose will be more fully explained below. Disposed within this cavity formed by the extension is a cup-shaped aluminum element 32 coated on the inside with alumina (aluminum oxide). In the lowermost portion of the cup 32 is disposed a booster mixture 35, which is a Thermit powder which has been compressed to approximately 100 pounds per square inch. Within the cup and above the booster mixture 35 is disposed a primer mixture 33. This primer may comprise fine particle size Thermit mixture having been compressed to about 100 psi. A thin nickel-chronium ignition wire 34 is disposed within the primer mixture 33. The ignition wire or fuse 34 may be electrically connected by crimping to a pair of copper wires 36 which are routed from the inner casing 30 to an externally accessible point. The cup-shaped element 32 which contains the entire fuse assembly may be covered with a plate formed of aluminum coated with aluminum.

This arrangement enables a very small current to melt the nickel-chronium ignition wire and ignite the primer Thermit powder. The power source may be, conveniently, a pair of two size D dry cell batteries which need not be contained within the device itself, but may be contained or stored by a submersible or carried by a diver where the depth is not excessive.

A weight 31 made of cast iron and weighing from five to ten pounds, for example, is positioned above the cup 32 containing the fuse assembly. The weight may be sufficient dimension to engage and be supported by the upward extension of the inner casing 30. Consequently, the weight 31 will exert a gravitational force on the casing 30 in a downward direction, when the device is used for underhand welding.

The inner casing 30 includes one or more openings 150 in its lower portion. The height of the openings, which may be holes formed by drilling into the casing 30, may be determined with little or no experiment. The function of the openings 150 is to provide an outlet for the flowable molten Thermit after it has reacted. The height of the holes will determine the time during which the Thermit will remain within the inner casing 30 before it exits through the openings 150. Alternatively, the openings 150 may be plugged with a material such as asbestos to resist the exit of molten reaction products until the plugs decompose. This time is used to pre-heat the surface 8 to be welded through a heat train more fully described below. In a preferred embodiment, the holes are approximately two inches above the base of the inner casing 30.

The casing 30 rests upon the bottom surface of a cup-shaped intermediate casing 50. The casing 50 has a radius approximately 2 inches greater than the cylindrical casing 30. The sidewalls of the casing 50 extend vertically upward beyond the elevation of the holes 150, so that molten Thermit leaving the casing through the holes will fall into the casing 50. The intermediate casing 50 is, in the preferred embodiment, cylindrical and the casing 30 similarly is cylindrical. However, it will be understood that other geometries may be used, as desired.

The bottom of the inner casing 30 is preferably beveled at an angle of approximately 45°. The bevel, however, does not extend completely through the thickness of the casing 30, but leaves a flat on the bottom of the casing of approximately 1/16th inch thickness.

The intermediate casing 50 includes an indentation on its bottom portion to align and mate with the bevel of the casing 30.

The interemediate casing 50, together with the casing 30, rests upon a load bearing plate 20. The plate 20 may illustratively be circular and in the embodiment constructed was approximately ½ inch thick. Preferably the plate 20 is composed of steel having a rust coating. This rust coating reduces the heat transfer from the casing 30 to the outer periphery of the plate 20, as the desired weld will be substantially directly below the casing 30. However, the plate 20 should be made of a heat conductive material, to help pre-heat the surface 8 to be welded.

The top surface of the plate 20 in the preferred embodiment includes an annular indentation in alignment with the indentation of the intermediate casing 50 and the bottom of the inner casing 30. The bottom surface of the plate 20 includes a ridge in alignment with the indentation on the top surface of the plate 20. The ridge rests upon the surface 8 to be welded.

An outer casing 100 having an upper portion 102 and a lower portion 104, together with the load-bearing plate, completely envelop the weight 31, the inner casing 30, the intermediate casing 50, and the fuse assembly. The lower portion 104 is, illustratively, cylindrical and has sufficient inside radius to fit over the cup-shaped interemediate casing 50. The bottom of the lower portion 104 is welded to the upper surface of the plate 20 to form a watertight seal and to provide a rigid structure. At the top surface of the cylindrical lower portion 104 are a plurality of mounting means, such as holes passing through the top of the lower portion 104, adapted to receive wire 27. This wire is made, preferably, of steel, and passes from one side to the lower portion 104 to and over the top of the weight 31, and down to an opposite hole in the top of the lowr portion 104. A sufficient number of wires 27 are used so that the weight 31, which fits into the upper part of the inner casing 30, will be firmly positioned in relationship to the lower portion 104 of the outer casing 100 and the plate 20 prior to ignition.

The upper portion 102 of the outer casing 100 in the preferred embodiment is also cylindrical, and fits over the entire assembly of the weight 31, casing 30, and at least part of the lower portion 104. The upper portion 102 includes a top surface 105 which is integral with the upper portion 102 and is watertight. The lower part of the upper portion 102 includes a transverse plate 106 having a circular cutout having substantially the same diameter as the lower portion 104. The inside edge of the transverse part 106 is welded to the outside edge of the lower portion 104 to form a watertight seal. Thus, the outer casing 100, together with the plate 20, form a completely watertight housing around the internal parts.

The transverse plate 106 of the upper portion 102 of the outer casing 100 includes one or more holes 25 for ventilation. Each of the holes is covered on the outside with a member 26, which, for example, may be adhesive tape. This member 26 prevents seawater from entering the casing 100 through the holes 25 until a predetermined event, described below. The upper portion of the casing 100 is comparable in size to a 1-gallon or 5-gallon paint can, although larger internal parts and corresponding casings 100 may be used, if desired.

The electrical leads 36 described above pass through a watertight opening in the outer casing 100 and terminate at a watertight cable connector 44. The cable connector may be fastened to a submersible or to an apparatus carried by a diver to provide electrical power at a desired time.

A desired number of eye bolts 22 may be mounted on the load-bearing plate 20. The eye bolt may engage a steel cable 40 passing through each of the bolts and meeting at a point above the device where a ring 41 may be secured to the cable 40. The ring 41 provides a convenient means to attach any desired cable to the device, and will accept, for example, a snap hook 43.

In the preferred embodiment, the plate 20 is tack welded to a surrounding flange or ring 12 made of steel coated with rust. The flange 12 has a greater outside diameter than the plate 20, and an inside radius approximately equal to the radius of the plate 20. A number of cutouts along the outside periphery of the flange 12 are made. Over each of the cutouts may be positioned a non-magnetic material plate 11, which in the preferred embodiment is aluminum. These non-magnetic plates 11 cover completely the cutouts in the flange 12, and support magnets 10 corresponding to each of the cutouts. The magnets may be Alnico V or ceramic, as desired, which may be mounted to the plates 11 by a suitable adhesive, such as "Weldwood". Consequently, the magnets are attracted to the ferrous plate 8, and draw the device close to the surface to be welded. The non-magnetic plate 11 serve to prevent the dissipation of the magnetic force through the flange 12. The flange 12 serves essentially to mount the magnets to the load-bearing plates 20.

The previously described device for underhand welding used in salvaging operates as follows. A cable is attached to the snap hook 43 which thereafter engages the ring 41 joining the steel cable 40 mounted to the eye bolts 22. A submersible transports the device at any desired depth to the site for salvaging, and lowers the device to a horizontal ferrous surface. The magnets 10 attract the ferrous surface 8 and move the device into position. The device approaches until the ridge 23 at the bottom surface of the plate 20 rests upon the outside surface of the plate 8, which may be painted, rust-coated, or have other impurities. The operator is the submersible, or the driver, as the case may be, may then provide a relatively small electrical current, such as from two D-type dry cells, to the copper leads 36 via the cable connector 44. The current passes through the nichrome wire 34 which has sufficient resistance and dimension to cause the wire 34 to melt. This temperature causes the primer 33 to ignite which, in turn, ignites the booster 35 formed of a slightly compressed Thermit powder. The reactants burn through the base of the aluminum cover 32 and cause the top surface of the primary charge 37 to react.

The solid main charge 37 burns downward at a substantially uniform rate. Although the theoretical achieved temperature may be approximately 3088° centrigrade, radiant heat losses lower the temperature of the radiants. Further, due to presence of aluminum, the reactants achieve a maximum temperature of substantially 2388° C, the boiling temperature of aluminum. As the reaction burns downward, the flux casing 39 is consumed and flows into the reaction products of the Thermit reaction. Thus, the lower portion of the inner casing 30 fills with molten iron and aluminum oxide slag, warming the base of the outer casing 100. The casing 30 does not melt at this time because the heat begins to dissipate through the weld nipple and the heat train formed by the indentations of the intermediate casing 50, the indentation of the plate 20 the ridge on the bottom surface of plate 20, and into the plate or surface 8 to be welded.

As the flux burns, it emits gas to create a vapor pressure within the watertight chamber formed by the outer casing 100 and plate 20, and eventually forces the covering member 26 off the lower transverse portion 106. The vapor pressure reduces by allowing the gases to pass through the holes 25 until the pressure within the defined chamber is overcome by the pressure of the seawater, which eventually enters through the holes 25. The seawater will not reach the welding sight; however, because the top of the lower portion 104 extends a distance above the transverse portion 106 and constitutes a bulkhead. The water level in the casing rises, until the pressure within the casing 100 is equal to the ambient pressure of the seawater. The height of the lower portion 104 should be calculated to be sufficient to prevent the seawater from flowing over the top of the lower portion 104.

As the molten iron and slag accumulates in the bottom of the inner casing 30, it ultimately reaches a level sufficient to pass through the holes 150. This secondary flow of the melt flows into the intermediate casing 50. The flux 51 begins to melt along with the tin coating on the inside of the casing 50. The flux and tin serve two purposes. First, the flux removes some of the heat from the molten reaction products and adds material to produce a stronger weld. The tin boils at 2260° C, thereby further lowering the temperature of the reaction products. Consequently, the tin constitutes a temperature regulation means to adjust the reaction products temperature to below 2300° C, to impart increased viscosity. Ultimately the flux 51 and the casing 50 are completely melted or evaporated and should have sufficient mass and physical or chemical properties to reduce the reaction products leaving the casing 30 to a temperature of approximately 1500° to 1900° C. These temperatures yield an improved weldment. Due to the heat removal in the lower portion of the device, the flowable reaction products become viscous.

Figure 2:
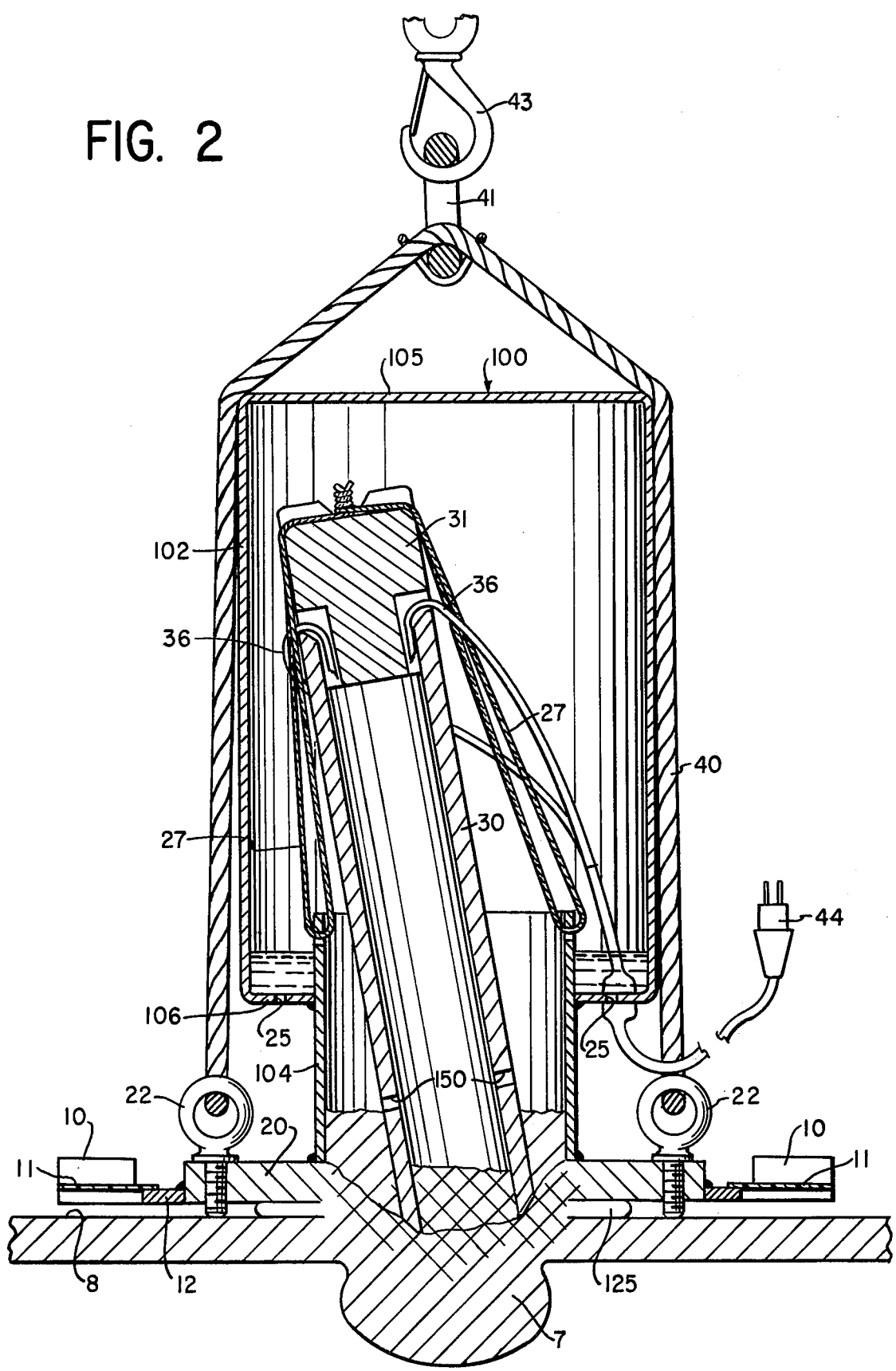
FIG. 2 is a sectional side view of the embodiment in FIG. 1 after the Thermit has reacted and welded to the surface desired.

As the temperature of the load-bearing plate 20 increases, the seawater in the space between the base of the plate 20 and the outside surface 8, approximately ⅛th inch, vaporizes. This pre-heats the area to be welded and removes some of the impurities. Most of the heat from the reaction products is thereafter transferred through the heat train described above and melts the plate 20 immediately below and for a small area around the casing 30. Part of the melt first passing through plate 20 does not enter surface 8, but flow parallel thereto and between the plate 20 and surface 8. This flow further preheats the area for welding and removes impurities from the surfaces. As seen in FIG. 2, this flow forms fin-shaped member 125 between plate 20 and surface 8. After this pre-heating, the weight 31 exerts a downward force on the molten plate 20 and improves the contact between it and the surface 8. As the surface 8 heats, the two surfaces weld together and the inner casing 30 moves downward. As shown in FIG. 2, the resulting position of the casing 30 may be presumed to be non-vertical. However, the steel wires 27 serve to retain movement of the casing beyond angular limits.

The melted portion of the load-bearing plate 20 and the portion of the plate or surface 8 immediately below the plate 20 run together when molten and form a globule 7, as shown in FIG. 2. This globule 7 extends below the surface of the plate 8 opposite the device. It may be assumed that the environment opposite the plate 8 will be seawater, in which case the globule 7 seals the weld from the seawater.

Because the seawater entering the holes 25 does not reach the welding site, and the seawater between the plate 20 and the surface 8 is vaporized and sealed from the actual weld within the surface 8, and because the lower part of the weld is insulated from seawater by the globule 7, the weld has sufficient time to anneal properly. This results in an extremely strong weldment. After approximately 2 minutes he weld will be annealed and force may be applied to the surface 8 through the cable 40 secured to the load-bearing plate 20. The force which may be applied is determined by the strength of the plate 20, which may be varied in the manner consistent with the device or object to be salvaged.

Figure 3:
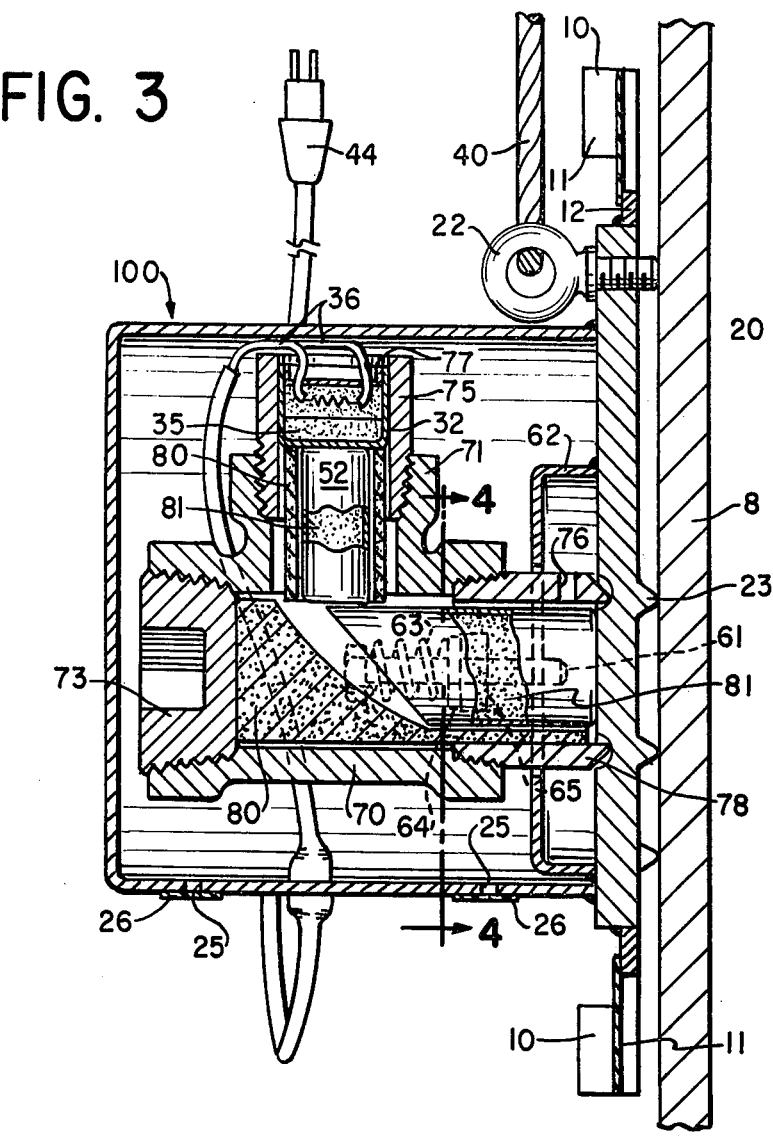
FIG. 3 is a sectional side view of an embodiment of the present invention adapted for underwater welding of objects wherein the device is to attach to a vertical surface.

A preferred embodiment using the present invention for thermit welding underwater to a vertical ferrous or other surface is shown in cross-section to FIG. 3. Similar to the embodiment of FIG. 1, this embodiment includes a load-bearing plate 20 tack welded to a flange 12 having cutouts covered by plates 11 over which are disposed magnets 10 for attracting the welding device to the ferrous object. An eye bolt 22 is mounted on the load-bearing plate above the outer housing 100 to receive hoisting means, such as cable 40.

The outer casing 100 is welded to form a fluid-tight seal to the load-bearing plate 20. At the lower portion of the outer housing 100, one or more blow off holes 25 are covered by covering members 26 adapted to disengage the outer housing 100 after a predetermined vapor pressure within the outer casing 100 is achieved.

The movable inner casing assembly may assume the shape of, for example, an inverted T having a lower transverse portion 70 and a vertical portion 71. One end of the transverse portion 70 may be covered with a steel pipe plug 73, and the free end of the vertical portion 71 may be fitted with a short pipe 75. The outside of the pipe 75 is sealed by plate 77. A short pipe 78 is fitted to the transverse portion of the inverted T opposite plug 73.

A flow retaining element 62 is welded to the load-bearing plate 20 and is disposed inside the chamber formed by the plate 20 and the casing 100. The retaining element 62 may constitute a cylindrical-shaped steel or iron cup having a central aperture of sufficient size to allow at least a portion of the transverse portion 70 of pipe T to pass through the aperture. The retaining cup 62 is positioned so that the aperture stands off from the plate 20.

Figure 4:
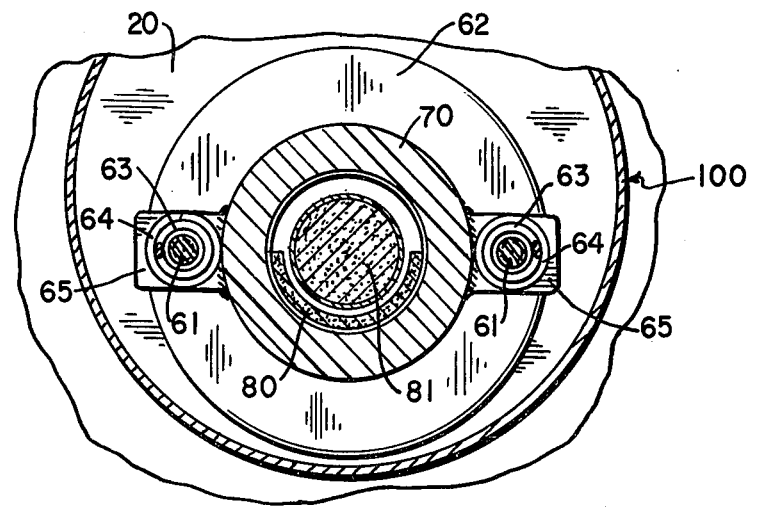
FIG. 4 is a plan view taken along the line 4—4 of FIG. 3.

As shown in FIG. 4, a pair of studs 61 is mounted to the retaining element 62 on opposite sides of the aperture and extending away from the plate 20. At the ends of the studs 61 opposite the aperture of the retaining plate 62 are the heads of the stubs. Immediately below the heads of the studs is coaxially mounted a spring 63 urging a washed 64 towards the retaining plate 62. The asbestos washer 64 engages an ear 65 mounted on the transverse portion 70 of the pipe T to urge the T towards the load-bearing plate 20.

Consequently, the transverse portion 70 and pipe 78, which constitute an inner casing, are urged toward the load-bearing plate 20 by a spring, rather than a weight (as in FIG. 1). Other designs within the scope of this invention may be used to provide a force to urge the inner casing towards the load-bearing plate 20, and it will be understood that this particular arrangement is for illustrative purposes only.

The pipe 75 contains the fuse assembly for the welding device. The fuse assembly is identical to the one described in the first embodiment.

Disposed immediately below the fuse assembly is the primary thermit charge 81 in an aluminum container 52. Inside the tranverse portion of the inner casing is disposed more compressed Thermit 81, as well as a flux material 80. The flux material 80 changes the flow direction of the reaction Thermit, and is therefore positioned in the transverse portion 70 of the T near the plug 73. When the burn of the Thermit reaction reaches the base of the vertical portion 71, it reaches the flux material which absorbs the heat on the left portion (referring to FIG. 3) and causes the reaction to proceed towards the plate 20.

The reaction site moves to the right and enters the pipe 78 which extends into the flow retaining elements 62. The part of the pipe which contacts the plate 20 may be bevelled according to the description above, and the plate 20 may include an identation on the inside surface and a ridge or other extension on the outside surface also as described above, to form heat conductive train which pre-heats the wall 8 to be welded.

Figure 5:
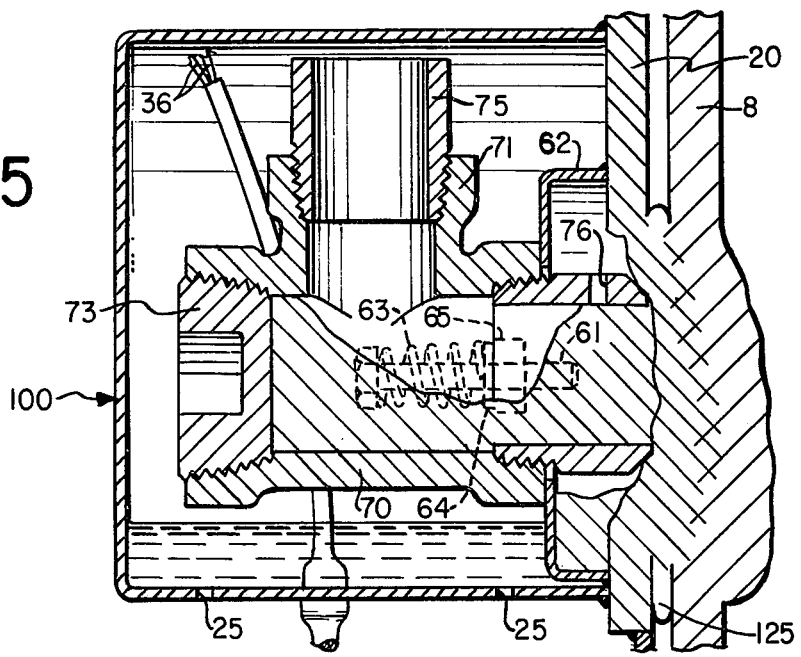
FIG. 5 is a sectional side view of the embodiment shown in FIG. 3 after the Thermit has reacted.

A secondary flow hole 76 in the upper portion of the pipe 78 and disposed within the chamber formed by the load-bearing plate 20 and the flow retaining plate 62 allows molten iron, or other reaction products, to exit the casing during the reaction. This expelled reaction product, illustrated in FIG. 5, pre-heats the plates 20 and 8. Further, after the product cools, it insulates the weldment to allow improved annealing.

Figure 6:
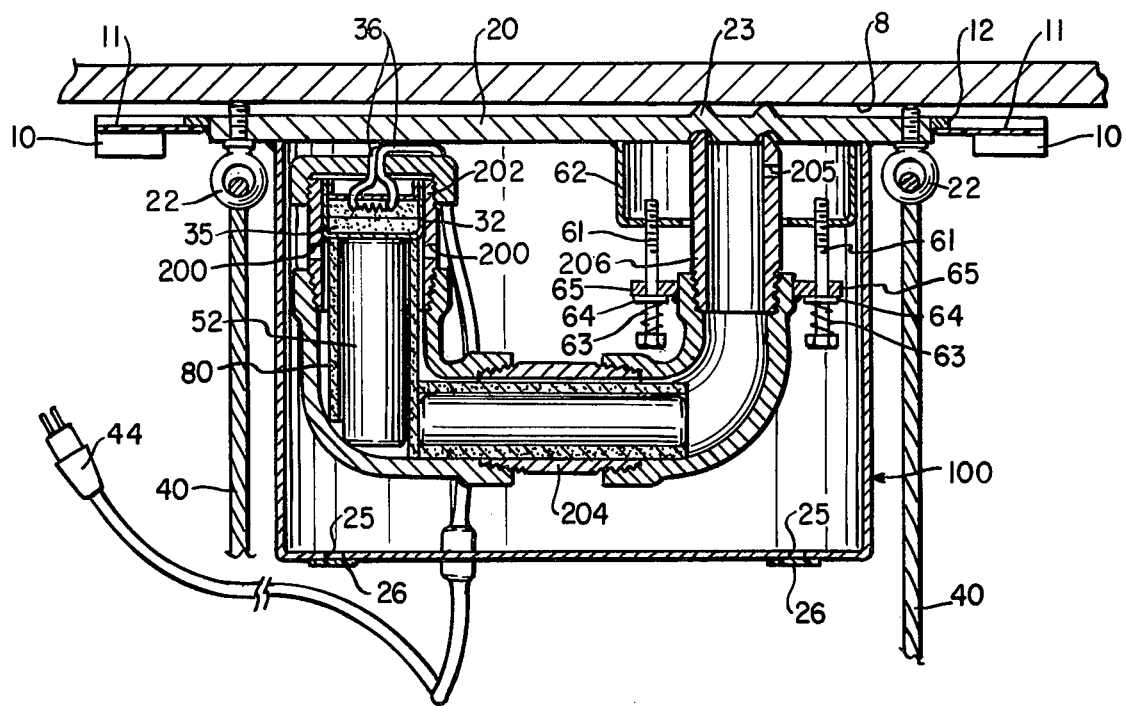
FIG. 6 is a sectional view of an embodiment of the present invention adapted for overhead welding.

A welding apparatus for overhead welding using the present invention is illustrated in FIG. 6 and includes a sequence of pipe nipples and L's arranged to form a U-shaped housing. A load-bearing plate 20 constitutes the uppermost portion of the apparatus. An outer casing 100 is welded the plate 20 form a fluid-type seal. A flow-retaining element 62, which has a cylindrical shape with a central aperture similar to the embodiment for welding to a vertical wall described above, faces upward. The aperture has sufficient dimension to movably receive the vertical portion of the pipe nipple. A pair of studs 61 is mounted as above with a pair of springs 63 arranged to urge the vertical portion within the flow-retaining plate 62 vertically upwards towards the load-bearing plate 20. The opposite vertical portion of the U-shape pipe formation include the fuse assembly.

A pair of holes 200 is disposed in the upper portion of the U-arrangement proximate the fuse assembly. The holes have sufficient dimension to allow escape of vapors generated by the Thermit reaction. The vapors develop a pressure above the remaining reaction products within the U-arrangement, and force the reaction products to travel down the first portion 202 of the U-formation, across the transverse portion 204, and up into the second vertical portion 206, which is more narrow than portion 202, so that the melt is forced ultimately to the load-bearing plate 20. In the preferred embodiment, the portion 202 has a diameter approximately double the diameter of portion 206.

A portion of the melt will exit the portion 206 through secondary flow hole 205, which functions as described above with respect to the other embodiments. This arrangement consequently provides for an inner casing urged towards the load-bearing plate to provide an apparatus adapted for overhead exothermic welding.

It will be understood that the purpose of the outer casings in each of the embodiments heretofore described serves to exclude sea water from the inner casing. When welding is to be done in a gaseous environment rather than under the sea, the outer casings are not essential and may be eliminated if desired. Thus, each of the embodiments is suitable for dry welding, with or without the outer casings 100.

To those skilled in the art it will be apparent that the present invention is capable of taking various useful forms, and it is preferred, therefore, that this disclosure be taken in an illustrative sense, and that the scope of protection be determined by the appended claims.

What is claimed as the invention is:

1. Apparatus for exothermic welding to a surface comprising:
   a plate adapted to be positioned substantially parallel to and contiguous with said surface;
   a casing disposed proximate said plate;
   a exothermic mixture disposed within said casing;
   igniting means, mounted proximate said mixture, for igniting said exothermic mixture; and
   urging means for urging said casing through said plate and into said surface after said exothermic mixture begins to react.

2. The apparatus according to claim 1 further comprising:
   an outer casing mounted on said plate, said outer casing forming a fluid-tight seal therebetween and enveloping said first-named casing; said first-named casing constituting an inner casing;
   an intermediate casing positioned between said inner casing and said outer casing proximate said plate;
   a flux material disposed between said inner casing and said intermediate casing; and
   a flux material disposed between said inner surface and said exothermic mixture.

3. Apparatus according to claim 1 wherein said inner casing includes an aperture proximate said plate for secondary flow of exothermic melt.

4. The apparatus according to claim 3 wherein said urging means comprises:

a stud fixedly fastened to said plate;

means for retaining a spring, associated with said stud;

a spring associated with said stud and said retaining means; and means engaging said spring with said inner casing for causing said spring to urge said inner casing towards said plate.

5. The apparatus according to claim 4 further comprising a flow-retaining arrangement mounted on said plate and having an aperture adapted to receive at least a portion of said inner casing adjacent said plate.

6. The apparatus according to claim 3 wherein said inner casing is elongated and said igniting means is disposed within the portion of said inner casing opposite said plate and adjacent a surface of said exothermic mixture.

7. The apparatus according to claim 4 wherein said urging means comprises a weight positioned at the upper portion of said inner casing and engaging said inner casing.

8. The apparatus according to claim 4 further comprising a self-standing flux material surrounding said exothermic mixture.

9. The apparatus according to claim 1 wherein said plate includes a ridge on the surface opposite said casings, said ridge being aligned with said inner casing, said plate also including an indentation on the surface opposite said ridge, said indentation adapted to receive the lower portion of said inner casing.

10. The apparatus according to claim 9 wherein the lower portion of said inner casing is beveled.

11. The apparatus according to claim 10 further comprising an intermediate casing having a base, said intermediate casing base including indentations aligned with said indentations of said plate and adapted to receive said bottom portion of said inner casing, said intermediate casing also including a surface disposed between said inner casing and said outer casing and extending beyond said holes in said inner casing.

12. Apparatus according to claim 1 wherein said plate and urging means are adapted to seal the weld between said plate and said surface from seawater.

13. The apparatus according to claim 1 further comprising: an outer casing mounted on said plate, said outer casing forming a fluid-tight seal therebetween and enveloping said first-named casing; said first-named casing constituting an inner casing wherein said outer casing includes an opening, and includes a portion forming a bulkhead between said opening and said inner casing; and a member covering said hole and adapted to disengage said outer casing when a predetermined pressure is obtained within said outer casing.

14. Apparatus according to claim 1 wherein said inner casing includes a transverse portion and first and second vertical portions positioned at opposing ends of said transverse portion, said igniting means being disposed in said first vertical portion; said second vertical portion normal to and abutting said plate for positioning; said first vertical portion including at least one hole to allow exit of gases resulting from the reaction of said exothermic mixture, said hole being dimensioned to cause said escaping gases to exert a force against the reaction products of said exothermic reaction to cause said reaction products to travel vertically upward in said second vertical member.

15. Apparatus according to claim 1 further comprising a spacer adapted to be positioned between said plate and said surface.

* * * * *

UNITED STATES PATENT AND TRADEMARK OFFICE
CERTIFICATE OF CORRECTION

PATENT NO. : 4,062,485
DATED : December 13, 1977
INVENTOR(S) : Leonard M. Andersen It is certified that error appears in the above-identified patent and that said Letters Patent are hereby corrected as shown below:

Column 1, line 8, the word "refers" should be --refer--;
          line 48, the word "materal" should be --material--;
          line 49, the comma "," after the numeral "8000" should be deleted.

Column 2, line 2, the word "on" should be --an--;
          line 10, the word "further" should be --Further--;
          line 13, the word "retracted" should be --reacted--;
          line 31 should read --sary the transportation of such a cumbrous and heavy--;
          line 54, the word "courser" should be --coarser--.

Column 3, line 4, the word "alinged" should be --aligned--;
          line 6, the word "pre-heats" should be --preheats--;
          line 61, the word "approximately" should be --approximate--

Column 4, line 10, the word "machines" should be --machined--;
          line 27, the word "ton" should be --top--;
          line 47, the word "aluminum" should be --alumina--;
          line 52, the word "itselt" should be --itself--;
          line 57, the word --of-- should be inserted after "be".

Column 5, line 61, the word "to" should be --of--;
          line 63, the word "lowr" should be --lower--.

Column 6, line 54, the word "serve" should be --serves--.

UNITED STATES PATENT AND TRADEMARK OFFICE
CERTIFICATE OF CORRECTION

PATENT NO. : 4,062,485
DATED : Dec. 13, 1977
INVENTOR(S) : Leonard M. Andersen

It is certified that error appears in the above-identified patent and that said Letters Patent are hereby corrected as shown below:

Column 7, line 1, the word "is" should be --in--;
          line 2, the word "driver" should be --diver--;
          line 16 should read --tigrade, radiant heat losses lower the temperature of--;
          line 17, the word "radiants" should be --reactants--.

Column 8, line 10, the word "flow" should be --flows--;
          line 38, the word "he" should be --the--.

Column 9, line 16, the word "washed" should be --washer--.

Column 10, line 6, the word "include" should be --includes--.

Signed and Sealed this

Twenty-third Day of May 1978

[SEAL]

Attest:

RUTH C. MASON
*Attesting Officer*

LUTRELLE F. PARKER
*Acting Commissioner of Patents and Trademarks*